United States Patent [19]

Montorfano

[11] Patent Number: 4,634,903

[45] Date of Patent: Jan. 6, 1987

[54] POWER FET DRIVING CIRCUIT

[75] Inventor: Gianpaolo Montorfano, Milan, Italy

[73] Assignee: Honeywell Information Systems Italia, Milan, Italy

[21] Appl. No.: 696,987

[22] Filed: Jan. 31, 1985

[30] Foreign Application Priority Data

Feb. 20, 1984 [EP] European Pat. Off. ........ 84101753.6

[51] Int. Cl.[4] ...................... H03K 17/687; H03K 3/33
[52] U.S. Cl. .................................. 307/571; 307/585; 307/300; 307/270
[58] Field of Search ................................ 307/571–585, 307/300, 270

[56] References Cited

U.S. PATENT DOCUMENTS

| 4,438,356 | 3/1984 | Fleischer | 307/571 |
| 4,461,966 | 7/1984 | Hebenstreit | 307/571 |
| 4,492,883 | 1/1985 | Janutka | 307/571 |

Primary Examiner—Stanley D. Miller
Assistant Examiner—B. P. Davis
Attorney, Agent, or Firm—Nicholas Prasinos; John S. Solakian

[57] ABSTRACT

This invention pertains to a power FET control circuit which operates at higher switching frequencies for reducing the output voltage ripple. The control circuit provides two pulse control signals each shifted 180° out of phase, each of such signals having a fixed frequency and a duty-cycle ratio which varies up to a maximum of 50%.

4 Claims, 3 Drawing Figures

POWER FET DRIVING CIRCUIT

BACKGROUND OF THE INVENTION

1. Field of the Invention

The present invention relates to a driving circuit of a power FET (Field Effect Transistor), and more particularly of FET power switching circuits.

2. Description of the Prior Art

Power semiconductor devices are widely used in ON/OFF control systems, as for instance in switching power supplies, in control systems to drive motors, electromagnets and so on. They are connected in series to a power supply and to a load and are switched on/off by a suitable control circuit responsive to the level of one or more quantities related to the load, such as the flowing current or the supply voltage. More particularly a switching power supply is fed by an unregulated source and must supply a regulated continuous voltage independently of the load changes. The input voltage is applied intermittently with a predetermined period utilizing a switch and an inductor, to a capacitor which is charged to a prefixed voltage value. Within the intermittent period the switch is ON (and therefore the LC system is fed) for a time interval which varies in accordance to the error between the charge voltage of the capacitor and the prefixed voltage value. The ratio between the time interval when the switch is ON and the preestablished intermittent period is called a duty cycle. The LC system acts as an energy accumulator and filter from which the load draws electrical energy at a voltage determined by the charge voltage of the capacitor. In other words, the capacitor is intermittently charged and tends to discharge because of the load. The load is therefore fed with a voltage subject to changes (ripple). To reduce to a minimum the voltage ripple it is necessary to use LC filters of high capacity and time constant and/or high intermittent frequencies for charging the capacitor. The last solution is preferable because the use of high filter capacities and inductances reduces the answer rate of the regulation system to the transients.

Up to now bipolar transistors have been widely used as switching devices operating in a frequency range from 20 to 35 KHz. Higher switching frequencies have not been generally used because of the high switching time of such transistors. In recent years power field effect transistors or FETs have been available on the market. Such FETs, besides requiring a low driving current, allow very high operative switching frequencies (up to 200 KHz) and, under the same switching frequencies, present losses much lower than those of the bipolar transistors. As to the switching power supplies, the advantage of using such devices to reduce the output voltage ripple and the value of the output capacitor is obvious. The semiconductor power switches are generally driven through a transformer because this offers several advantages, such as impedance matching, DC isolation and either step up or step down capability. Unfortunately a transformer, because of the core saturation, can deliver only AC driving signals and therefore switch on the semiconductor switch devices coupled to it only for time intervals less than the period of the driving signal. Unless complex demagnetization circuits are used, the duty cycle of this type of driven switches cannot exceed 50% without incurring obvious disadvantages as to the ripple and the instantaneous power to be delivered by the unregulated voltage source. On the other hand, higher duty cycle values allow both feeding the load through the switching device with a wide range of voltages and obtaining a faster answer to the transient of the output quantity which is controlled. In order to obtain large duty-cycle ratios it is necessary to feed the driving transformer through complex circuits or to replace it with other devices, as for example, optical couplers to provide the necessary drive isolation. However such optical couplers, besides having a low noise immunity and a higher output impedance, also require additional voltage sources which make for a more complex and expensive driving circuit. Moreover, when a power FET is used as a switching device, the high output impedance of an optical coupler seriously compromises the switching speed of such FET, said speed depending on the charging and discharging of the intrinsic gate-source capacitance. In order to obtain the advantages from the use of a driving transformer for a power FET (also in case large duty-cycle ratios are required) the bood "HEXFET ® DATABOOK—Power mosfet application and product data 1982-1983", published by the firm, INTERNATIONAL RECTIFIER, discloses on pages A128, A129 a driving circuit wherein a control signal, which alternately varies between a voltage $+V$ and $-V$, commands through a transformer the switching of a power FET. During the positive alternation of the control signal, the intrinsic gate-source capacitance of the FET rapidly charges through a diode and switches ON such FET. This charge is kept, and therefore the FET remains ON, even if the transformer core saturates. During the negative alternation, the intrinsic capacitance of the FET rapidly discharges through an additional FET which is switched ON. This solution, besides requiring some components of the primary winding of the transformer to limit the saturation current of such transformer, is not very reliable because of possible leakage paths through which the intrinsic gate-source capacitance of the FET may discharge during the time interval when the transformer is in saturation. Then the reliability of the above solution tends to become less if some protection circuits between gate and source of the FET are required. In fact, such protection circuits reduce the equivalent impedance on the ends of the intrinsic gate-source capacitance of the FET. Additionally the above-mentioned solution has a limited immunity to the noise which may drift on the FET gate through the intrinsic drain-gate capacitance. These disadvantages are overcome by the driving circuit of the present invention wherein the power FET, used as a switching device, operates within a range of duty-cycle variations from 0% to 100% and wherein the driving transformer, also for very large duty-cycle ratios, never is brought to saturation and the charge of the intrinsic gate-source capacitance of the FET is sustained by a control voltage during the time such FET is On.

OBJECTS OF THE INVENTION

It is a primary object of the invention to provide an improved power FET control circuit.

It is another object of the invention to provide an improved FET control circuit which provides pulse control signals shifted 180° out of phase.

It is a further object of the invention to provide an improved FET control circuit having a fixed frequency and a duty-cycle ratio which varies up to a maximum of 50%.

SUMMARY OF THE INVENTION

The foregoing objects are achieved according to one embodiment of the invention by using a power FET control circuit which provides on two different outputs two pulse control signals shifted 180° out of phase with each other, each of such signals having a fixed frequency and a duty-cycle ratio which varies up to a maximum of 50%. The two outputs of the control circuit are connected to the end of the primary winding of a driving transformer provided with two secondary windings. Therefore a series of alternately positive and negative voltage pulses is present on the primary winding and on each of the secondary windings of the driving transformer, the length of such pulses depending on the state of the output quantity which is controlled. Some diodes rectify the voltage pulses on the secondary windings. In this way a pulse control signal is obtained having a frequency twice that of the signals present on the outputs of the control circuit and a duty-cycle ratio which varies up to a maximum of 100%. Such pulse control signal, during the time when it is at logical/electrical level 1, is applied between the gate and the source of the power FET. When it falls to logical/electrical level 0, it switches on an additional switching device connected in parallel to the intrinsic capacitance between gate and source of the power FET. When the control pulse voltage falls to logical/electrical level 0, bipolar transistor 57 is switched ON by the same charge voltage of intrinsic capacitance 2 and allow a fast discharging of such capacitance.

Driving circuit 5 of power FET 1, having intrinsic capacitance 2 between gate and source, receives from control circuit 4 a first (A) and a second (B) pulse voltage, said voltages being shifted 180° out of phase each from the other and having a fixed frequency and a duty cycle ratio which varies up to a maximum of 50%. The pulse voltages are applied to the ends to the primary winding of the transformer 50 which therefore is supplied by alternately positive and negative pulses. Some diodes (51A, 51B and 52A, 52B) rectify the voltage on the secondary windings of the transformer and render available on nodes R, S a control pulse voltage having a frequency twice of that of the pulses as input to the transformer, and duty cycle ratio which varies up to a maximum of 100%. The control pulse voltage, when it rises to logical/electrical level 1, charges very fast intrinsic capacitance 2 of FET 1 because bipolar transistor 57 is nearly immediately switched OFF.

BRIEF DESCRIPTION OF THE DRAWINGS

These and other features of the driving circuit will appear clearer from the following description of a preferred embodiment of the invention and from the enclosed drawings wherein.

DETAILED DESCRIPTION OF THE PREFERRED EMBODIMENT

Figure 1:
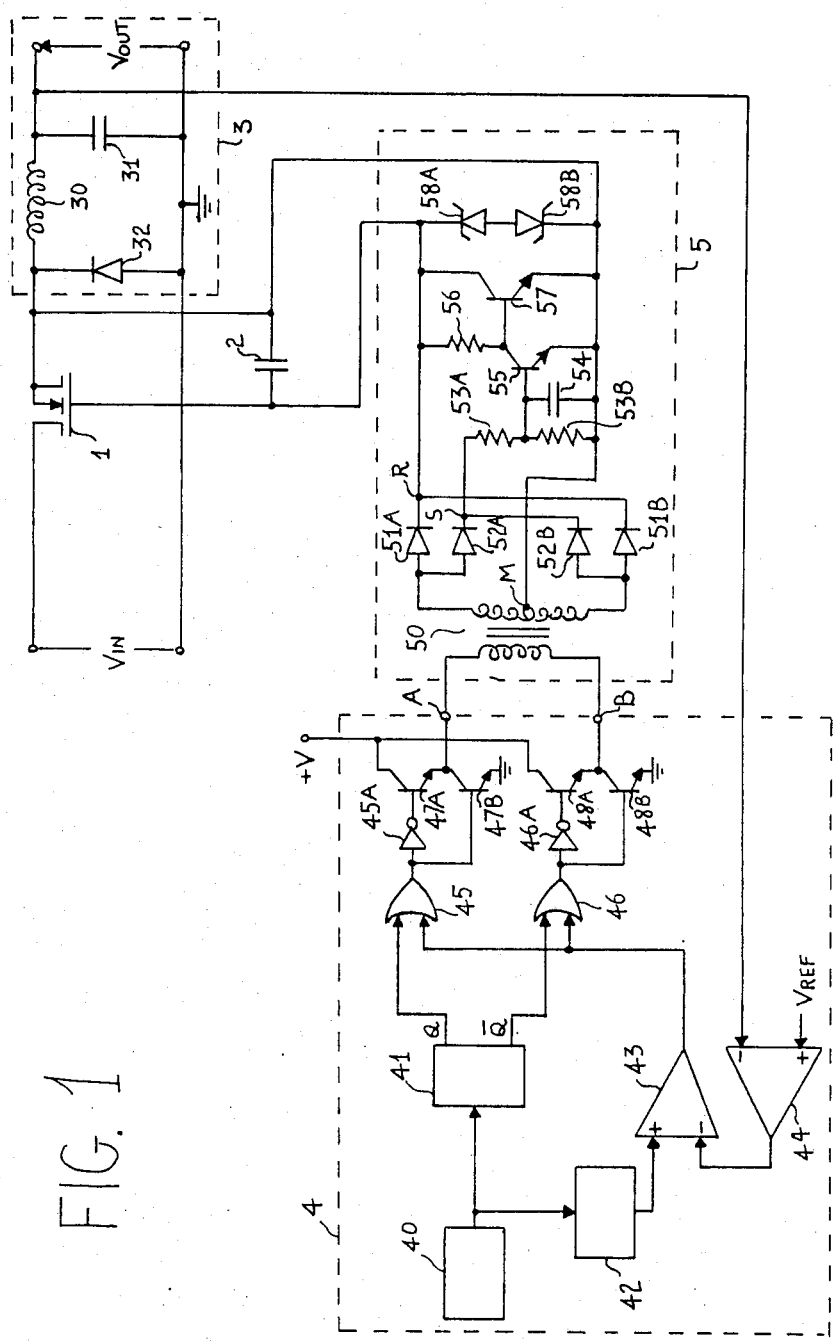
FIG. 1 shows the electrical diagram of the power FET driving circuit according to the invention.

Referring to FIG. 1, there is shown an ON/OFF control system wherein a switching power FET 1, having an instrinsic gate-source capacitance 2, intermittently transfers electrical energy from a continuous voltage source $V_{IN}$ to a network 3. The energy transfer is controlled by a control circuit 4 which, through the driving circuit 5 of the present invention, controls the ON/OFF switching of FET 1 on the grounds of the level reached by a prefixed quantity within network 3. Network 3 comprises a smoothing filter, comprised of an inductor 30 and a capacitor 31 and a recycle diode 32. Therefore the system of FIG. 1 represents the particular case of a DC regulator and the considerations which will be made for such system are valid even though network 3 may be representative of any other circuit. The quantity of network 3 which control circuit 4 uses to control the switching of FET 1 is comprised in this case by output voltage $V_{OUT}$ on the ends of capacitor 31. Control circuit 4 is practically a pulse width modulator. It schematically comprises an oscillator 40 which provides a fixed frequency output pulse signal. The output of oscillator 40 is connected to the input of a D flip-flop 41 which acts as a frequency divider and to the control input of a ramp circuit 42. The output of ramp circuit 42 is connected to the non-inverting input of a comparator 43 which receives on its inverting input the signal present on the output of an error amplifier 44. Amplifier 44 receives on its inverting and non-inverting input output voltage $V_{OUT}$ and a reference voltage $V_{REF}$ respectively and provides on its output a signal proportional to the deviation of voltage $V_{OUT}$ relative to voltage $V_{REF}$. Therefore comparator 43 provides a series of pulses whose length depends on the error signal on the output of amplifier 44. The output of comparator 43 is connected to an input of 2 two-input OR gates 45, 46. The second inputs of OR gates 45, 46 are connected to output Q, $\overline{Q}$ of flip-flop 41 respectively. The output of OR gate 45 is connected to the base of a transistor 47B and, through a NOT gate 45A, to the base of a transistor 47A. Transistor 47A, 47B are connected in series between a supply voltage +V and ground. A first output A of circuit 4 is derived from the conecting point of the emitter of transistor 47A with the collector of transistor 47B. Likewise OR gate 45, also the output of OR gate 46 is connected to the base of a transistor 48B and, through a NOT gate 46A, to the base of a transistor 48A. Also transistors 48A, 48B are connected in series between voltage +V and ground. A second output B of circuit 4 is derived from the connecting point of the emitter of transistor 48A with the collector of transistor 48B.

Figure 2:
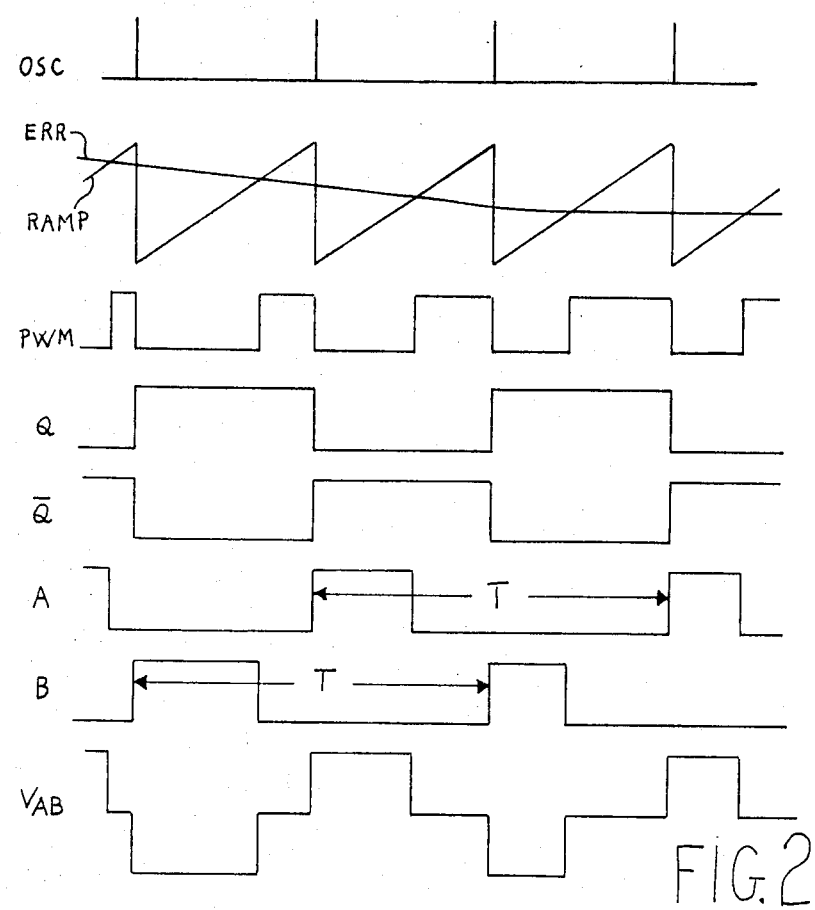
FIG. 2 shows the idea waveforms of the voltages on some points of the driving circuit of FIG. 1.

FIG. 2 shows the waveforms of some signals present on some points of control circuit 4 of FIG. 1. In particular:

diagram OSC shows the series of pulses on the output of oscillator 40;

diagram RAMP shows the signal present on the output of ramp circuit 42;

diagram ERR shows as an example a particular waveform of the signal present on the output of error amplifier 44;

diagram PWM shows the signal present on the output of comparator 43;

diagrams Q, $\overline{Q}$ show the signals present on outputs Q, $\overline{Q}$ respectively of flip-flop 41;

diagrams A, B shows the voltages, referred to ground, present on outputs A, B respectively of circuit 4;

diagram $V_{AB}$ shows the waveform of the voltage between A and B of circuit 4.

It is to be noted from diagrams A, B that the output pulses from control circuit 4 may have a maximum length equal to 50% of their period T. Several integrated circuits having the above-described performances of control circuit 4 are present on the market, as for example the integrated circuit marketed by the firm SILICON GENERAL with code 3525.

Referring again of FIG. 1, driving circuit 5, which comprises more properly the object of the present invention, includes a driving transformer 50 comprising two secondary windings having a common end M. The two ends of the primary winding of transformer 50 are respectively connected to outputs A, B of control circuit 4. The primary winding of transformer 50 is therefore supplied with voltage pulses having an alternately positive and negative amplitude, as shown by diagram $V_{AB}$ of FIG. 2. The free ends of the secondary windings of transformer 50 are connected to the anodes of recitifying diodes 51A, 52A and 51B, 52B respectively. The cathodes of diodes 51A, 51B (52A, 52B) are connected each other in node R(S). It is easy to deduce that a driving pulse signal having a frequency twice that of the signals on outputs A, B of control circuit 4 is present on nodes R, S. Moreover the pulses on nodes R, S may reach a length equal to 100% of their period. A voltage divider, comprised by a resistor 53A and 53B, is connected between node S and common end M of the secondary windings of transformer 50. A capacitor 54 is connected in parallel to resistor 53B to avoid an overvoltage during the rising edges of the driving pulses. The common node of resistors 53A, 53B and of capacitor 54 is connected to the base of a bipolar transistor 55 having the emitter connected to common end M. The collector of transistor 55 is connected to node R through a resistor 56 and to the base of a transistor 57 having the emitter and the collector respectively connected to common end M and to node R. Node R and end M are also respectively connected to the gate and to the source of FET 1, that is to the ends of intrinsic capacitance 2. Two Zener protection diodes 58A, 58B prevents the voltage between the ends of capacitance 2 from exceeding or falling below a prefixed value.

The operation of the described driving circuit is very simple. As soon as a driving pulse occurs on nodes R and S, almost immediately transistor 55 is switched ON and transistor 57 is switched OFF. Intrinsic capacitance 2 charges very fast and switches ON FET 1. The driving pulse keeps up the charge of capacitance 2 during the time when it is at logical/electrical level 1. As soon as the driving pulse falls to logical/electrical level 0, almost immediately transistor 55 is switched OFF. But node R remains at logical/electrical level 1 because of the charge voltage of capacitance 2. Therefore transistor 57 is immediately switched ON and capacitance 2 discharges very fast. It is to be noted that the presence of an identical driving pulse on nodes R, S is necessary to avoid that, when such pulse falls to logical/electrical level 0, the charge voltage of intrinsic capacitance 2 may affect the state of transistor 55.

Figure 3:
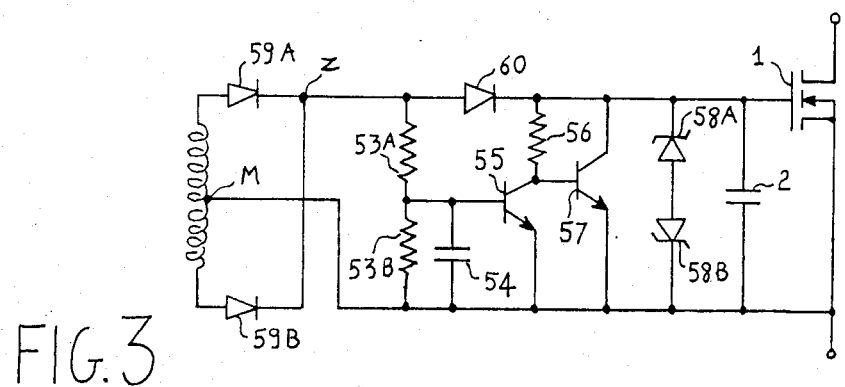
FIG. 3 shows a variant of the driving circuit of FIG. 1.

It is clear that numerous other solutions may be used to prevent such phenomenon. For example, FIG. 3 shows a possible variant of the driving circuit of the present invention. Compared with the driving circuit of FIG. 1, the one of FIG. 3 presents on only a couple of rectifying diodes 59A, 59B and an additional diode 60 which prevents the discharging of capacitance 2 through the voltage divider comprised of resistors 53A, 53B when the driving pulse on node Z falls to logical/electrical level 0.

Other changes may be made in the described driving circuit without departing from the scope of the present invention. For instance, referring to FIG. 3, another obvious change is the one of using a transformer with only a secondary winding and of rectifying the alternate pulse voltage present on the ends of such secondary winding by means of a diode bridge. The output voltage from the diode bridge is therefore completely equivalent to the one available between node Z and M of FIG. 3. A further obvious change is that one of replacing bipolar transistors 55, 57 of FIGS. 1 and 3 with a couple of complementary transistors in push-pull configuration.

What is claimed is:

1. Power FET driving circuit, said FET having gate, drain and source terminals and an intrinsic capacitance between said gate terminal and said source terminal, said driving circuit being coupled to a control circuit which controls the switching ON/OFF of said FET, said control circuit providing on a first (A) and second output (B) respectively a first and a second pulse voltage with fixed frequency and duty cycle ratio which varies up to a maximum of 50%, said first and second pulse voltage having the same polarity as to a common reference ground and being shifted 180° out of phase each from the other, characterized in that it comprises:

a transformer having a primary and at least a secondary winding, the ends of said primary winding being connected to said first and second output of said control circuit, rectifying means having input and output said input being connected to the ends of said at least secondary winding of said transformer and rendering available at said output a third pulse voltage having one of two possible logical/electrical levels and a frequency twice that one of said first and second pulse voltages and duty cycle ratio which varies up to a maximum of 100%, under control of said control circuit, and switch means connected to said output and controlled by said third pulse voltage to apply said third voltage to said intrinsic capacitance when said third voltage is at one of said two logical/electrical levels and to short circuit said intrinsic capacitance when said third voltage changes to the other of said two logical/electrical levels, whereby said power FET is switched-on and switched-off at the frequency of said third pulse voltage with a duty cycle ratio which varies up to a maximum of 100%.

2. Power FET driving circuit as recited in claim 1 characterized in that said additional switch means comprise a first and second bipolar transistor, said first transistor receiving on its base said third pulse voltage through a voltage divider and having its emitter connected to said source terminal, the collector of said first transistor being connected to said gate terminal through a resistor, the base of said second transistor being connected to the collector of said first transistor, the emitter and the collector of said second transistor being connected to said source terminal and to said gate terminal respectively.

3. Power FET driving circuit of claim 2 characterized in that said transformer has two secondary windings having a common end and in that said rectifying means comprise a first and second couple of diodes, each diode of each couple having the anode connected to the free end of one of said two secondary windings, the cathodes of the diodes of said first and second couple being connected to each other to form a first and second node respectively, said third pulse voltage being available between said first and second node and said common end of said secondary windings, said first node being connected to said gate terminal, said second node being connected to said voltage divider, said common end being connected to said source terminal.

4. Power FET driving circuit as recited in claim 2 characterized in that said transformer has two secondary windings having a common end and in that said rectifying means comprise a first and second diode, each diode having the anode connected to the free end of one of said two secondary windings, the cathodes of said first and second diodes being connected to each other to form a node, said third pulse voltage being available between said node and said common end of said two secondary windings, said node being connected to said voltage divider and to the anode of a third diode, the cathode of said third diode being connected to said gate terminal, said source terminal being connected to said common end.

* * * * *